United States Patent
Enam (10) Patent No.: US 12,522,223 B2
(45) Date of Patent: Jan. 13, 2026

(54) MAP-ASSISTED TARGET DETECTION FOR SENSOR CALIBRATION

(71) Applicant: GM Cruise Holdings LLC, San Francisco, CA (US)

(72) Inventor: Syed Aziz Enam, Fremont, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 613 days.

(21) Appl. No.: 17/859,613

(22) Filed: Jul. 7, 2022

(65) Prior Publication Data

US 2024/0010208 A1 Jan. 11, 2024

(51) Int. Cl.
| | | |
|---|---|---|
| *B60W 50/00* | (2006.01) | |
| *B60W 60/00* | (2020.01) | |
| *G01S 7/40* | (2006.01) | |
| *G01S 7/497* | (2006.01) | |
| *G01S 13/931* | (2020.01) | |

(52) U.S. Cl.
CPC .... *B60W 50/0098* (2013.01); *B60W 60/0015* (2020.02); *G01S 7/403* (2021.05); *G01S 7/4972* (2013.01); *G01S 13/931* (2013.01); *B60W 2050/0052* (2013.01); *B60W 2050/0088* (2013.01); *B60W 2520/10* (2013.01); *B60W 2554/20* (2020.02); *B60W 2554/40* (2020.02); *G01S 2013/9323* (2020.01)

(58) Field of Classification Search
CPC ........ B60W 50/0098; B60W 60/0015; B60W 2050/0052; B60W 2050/0088; B60W 2520/10; B60W 2554/20; B60W 2554/40; G01S 7/403; G01S 7/4972; G01S 13/931; G01S 2013/9323; G01S 7/4802; G01S 17/42; G01S 17/58; G01S 17/86; G01S 17/875; G01S 2013/93185; G01S 7/003; G01S 2013/9316; G01S 2013/9318; G01S 13/60; G01S 13/89; G01S 7/415; G01S 13/862; G01S 13/865; G01S 13/867; G01S 13/874; G01S 15/931; G01S 2013/9319; G01S 2013/932; G01S 2013/9322; G01S 2013/9324
See application file for complete search history.

(56) References Cited

U.S. PATENT DOCUMENTS

| | | | |
|---|---|---|---|
| 10,992,755 B1 * | 4/2021 | Tran | G01S 13/88 |
| 2011/0071761 A1 * | 3/2011 | Cummings | G08G 1/165 |
| | | | 701/301 |
| 2016/0223661 A1 * | 8/2016 | Song | G01S 13/86 |
| 2019/0258737 A1 * | 8/2019 | Wang | G01C 21/3848 |
| 2019/0293756 A1 * | 9/2019 | Blaes | G01S 7/4026 |
| 2022/0050191 A1 * | 2/2022 | Zhu | G01S 17/42 |
| 2022/0066006 A1 * | 3/2022 | Abari | G01S 17/931 |

* cited by examiner

*Primary Examiner* — Aniss Chad
*Assistant Examiner* — Chase L Cooley
(74) *Attorney, Agent, or Firm* — CANTOR COLBURN LLP (57) ABSTRACT

System, methods, and computer-readable media for extrinsically calibrating sensors on an autonomous vehicle (AV) by leveraging map data. By leveraging offline data, such as the map data on the AV, the extrinsic calibration of the sensors may be performed on road to update or check previous calibrations. Static objects are determined in the scene by leveraging a map with a semantic map layer and sensors are extrinsically calibrating using a portion of a set of static points associated with the determined static objects by determining relative positions and angles the sensors.

20 Claims, 5 Drawing Sheets

205 — RECEIVING, FROM ONE OR MORE SENSORS OF AN AUTONOMOUS VEHICLE (AV), SENSOR DATA MADE UP OF POINTS REFLECTED OFF OF OBJECTS DETECTED IN AN ENVIRONMENT SURROUNDING THE AV WHILE THE AV IS IN MOTION

210 — DETERMINING, AT THE AV, STATIC OBJECTS IN THE ENVIRONMENT BY CORRELATING THE SENSOR DATA WITH OBJECTS REPRESENTED IN A MAP WITH A SEMANTIC MAP LAYER STORED AT THE AV, THE SEMANTIC MAP LAYER INCLUDING LABELS PROVIDING SEMANTIC MEANING TO OBJECTS REPRESENTED IN THE MAP

215 — DETERMINING A RELATIVE POSITION AND A RELATIVE ANGLE BETWEEN A FIRST SENSOR OF THE ONE OR MORE SENSORS AND A FORWARD MOTION VECTOR OF THE AV, THE DETERMINED RELATIVE POSITION AND THE DETERMINED RELATIVE ANGLE ASSOCIATED WITH A HIGHEST NUMBER OF DETERMINED STATIC POINTS AFTER EGO-MOTION COMPENSATION FROM A SELECTED SET OF STATIC POINTS FROM THE STATIC OBJECTS DETERMINED BY THE SEMANTIC MAP LAYER

220 — SETTING, AT THE AV, THE FIRST SENSOR TO BE AT THE DETERMINED RELATIVE POSITION AND THE DETERMINED RELATIVE ANGLE FROM THE FORWARD MOTION VECTOR TO EXTRINSICALLY CALIBRATE THE FIRST SENSOR

MAP-ASSISTED TARGET DETECTION FOR SENSOR CALIBRATION

TECHNICAL FIELD

The subject technology relates to extrinsic calibration of sensors on an autonomous vehicle (AV), and more specifically, extrinsic calibration based on a semantic map layer.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for extrinsically calibrating sensors on an autonomous vehicle (AV) by leveraging map data, such as high-definition precision Light Detection and Ranging (LiDAR) map data and a semantic mapping layer. Extrinsic calibration of the sensors is focused on position and orientation (pose) with respect to the AV, as opposed to intrinsic focused on parameters such as focal length. In order to take sensor measurements from one sensor and combine them with sensor measurements from another, or globally, the relative position of a sensor to other sensors, or a central sensor associated with a center axis that defines the body frame of the AV, needs to be determined. By leveraging offline data, such as the map data on the AV, the extrinsic calibration of the sensors may be performed on the road to update or check previous calibrations. As such, the disclosed technology accounts for and corrects slight drifts from a previous calibration without needing to rely on checkers that determine when sensor calibrations are conspicuously off.

Leveraging map data on the AV provides a quicker way to distinguish between static objects and moving objects, which can speed up the process of calibration. For example, a histogram can be generated for at least one of the sensors, and each bar of the histogram can correlate to a number of determined static points determined at a respective potential position and angle of the at least one of the sensors. Then, a particular position and angle that is associated with a maximum number of determined static points can be selected.

In some examples, the sensors are Radio Detection and Ranging (RADAR) sensors, which detect not only where objects are but also how fast they are moving towards the sensor. Ego-motion compensation is used for RADAR sensors to compensate for motion by the sensor, or in this case caused by the driving of the AV. In other words, ego-motion compensation (e.g., compensating for the forward motion of the vehicle) may be performed based on vehicle odometry (e.g., based on the forward motion of the vehicle). As such, this generally reduces the errors of establishing that static objects are static when the car is moving.

The training techniques and safety score prediction model for an autonomous vehicle of the present technology solves at least these problems and provide other benefits as will be apparent from the figures and description provided herein.

Figure 1:
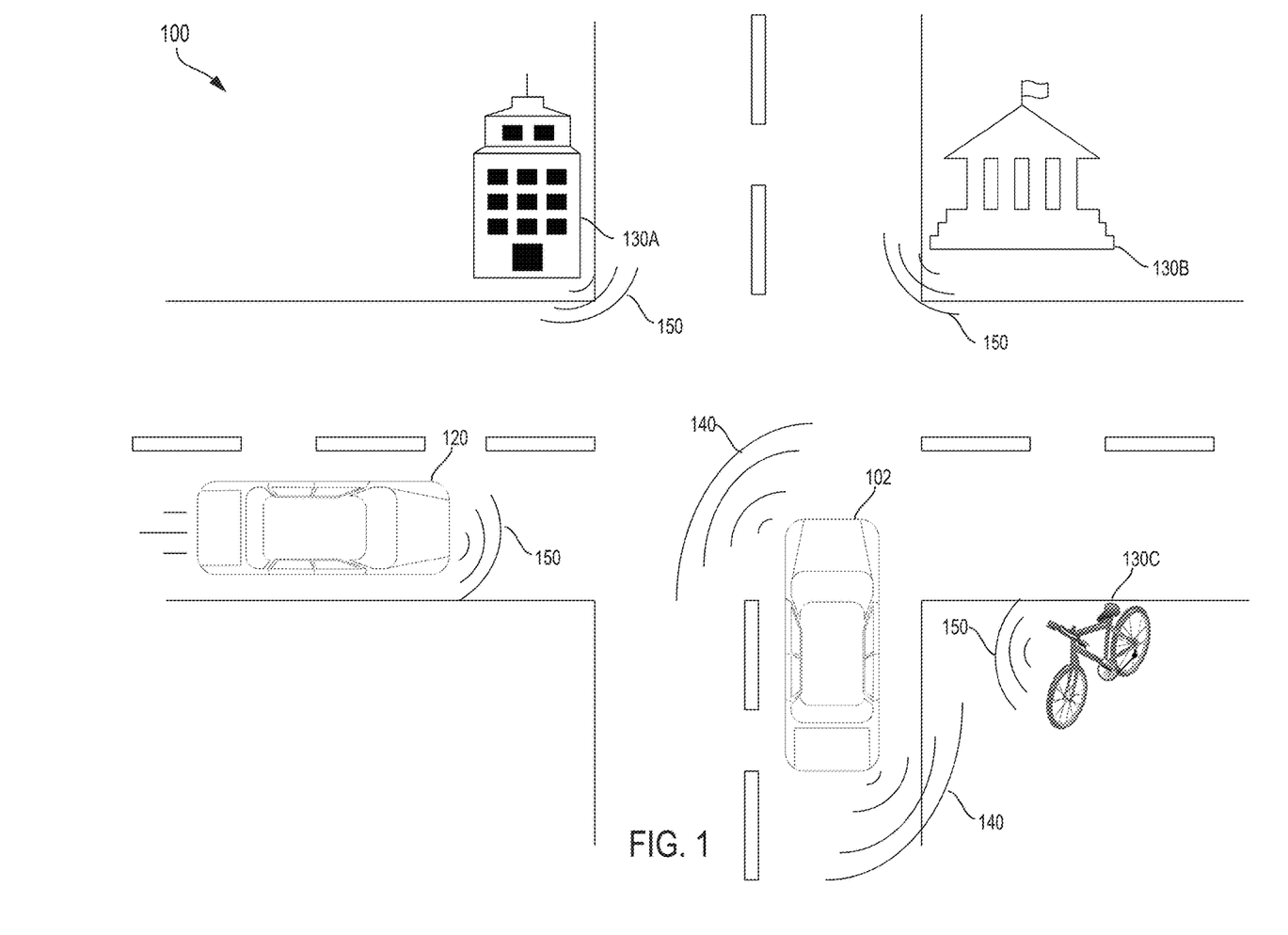
FIG. 1 illustrates an example environment in which a sensor calibration process can be implemented, according to some examples of the present disclosure.

FIG. 1 illustrates an example environment in which a sensor calibration process can be implemented. Environment 100 includes an autonomous vehicle (AV) 102 that can collect sensor data regarding about various objects in environment 100. As discussed above, sensor data can include data acquired from various AV sensors, including but not limited to one or more radar sensors, LiDAR sensors, camera sensors, thermal camera sensors, or the like. Sensor data can be collected by AV 102 at different times, and the type of collected sensor data can vary, depending on the desired implementation. By way of example, AV 102 can be configured to receive a first set of sensor data by transmitting radar signals 140 and receiving return radar signals 150 from objects 120, 130 around AV 102. Some of the objects in environment 100 may be moving objects (e.g., objects 120), and some may be stationary objects 130 (e.g., 130A, 130B, 130C).

In practice, sensor data, such as radar data, can be used to detect object motion (or lack thereof), e.g., by identifying a Doppler effect from return radar signals 150. For example, an autonomous vehicle that utilizes radar can detect stationary and moving objects based on the Doppler effect, which can be used to register the velocities of moving objects. When an autonomous vehicle is moving, it appears that the surroundings of the autonomous vehicle are also moving. However, corrections can be performed in view of the autonomous vehicle's motion. For example, corrections can be performed by techniques such as ego-motion compensation whereby ego-motion of the one or more sensors is compensated by a velocity estimate of the AV.

In some approaches, static objects can be identified in a set of sensor data (e.g., radar data) based on mapping from HD map data and a semantic map layer to corresponding elements. HD maps serve as one part of the "eyes" of the AV 102 and can be made up of two main types of assets: 3D tiles that are rendered from LiDAR sensor data and semantic labels that are applied on top of this sensor data to give meaning to the environment. HD maps provide the AV 102 with information about real-world environmental features, such as the boundaries of lanes, locations of traffic lights and buildings, and the presence of curbs at the edge of the roadway. All of this information lightens the real-time processing load on the self-driving vehicle, letting it focus on navigating around dynamic actors in the roadway, such as vehicles, bicycles, and pedestrians. In some implementations, this mapping is achieved through calibration techniques for relating extrinsic (position and orientation) relations between different sensors, as well as calibration of intrinsic properties of the various sensors. The present technology is directed at the extrinsic calibration aspect.

Leveraging the HD map lightens the processing load in determining that building 130A and building 130B are static because they likely did not change from when the HD map was last updated. However, other static objects like parked bicycle 130C would not be registered by the HD map because while the HD maps may be up-to-date with real-world changes, the parked bicycle 130C is not considered to be part of such an updated HD map and nor should it. Whether or not the parked bicycle 130C is static is further determined like other moving objects. With respect to the extrinsic sensor calibration of the present technology, only a number set of static points are required and therefore, by leveraging the HD map, such static points can be quickly identified.

Figure 2:
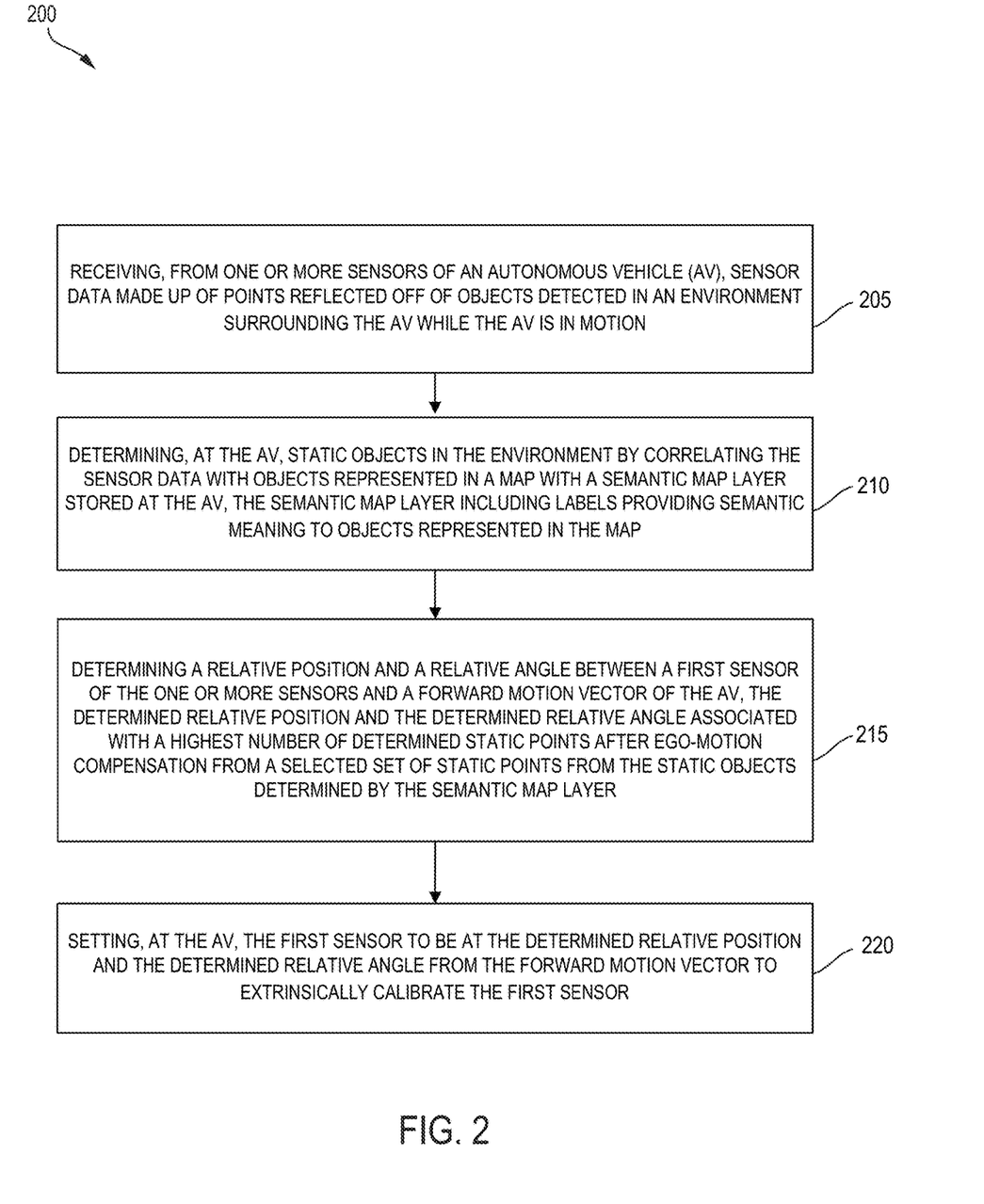
FIG. 2 illustrates an example flow diagram of sensor calibration using map-assisted target detection, according to some examples of the present disclosure.

FIG. 2 illustrates an example method 200 for sensor calibration using map-assisted target detection. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes receiving, from one or more sensors of an autonomous vehicle (AV), sensor data made up of points reflected off of objects detected in an environment surrounding the AV while the AV is in motion at block 205. For example, the local computer device 410 illustrated in FIG. 4 may receive the sensor data. Furthermore, the sensor data may be return radar signals 150.

According to some examples, the method includes determining, at the AV, static objects in the environment by correlating the sensor data with objects represented in a map with a semantic map layer stored on the AV at block 210.

The semantic map layer may include labels providing semantic meaning to objects represented in the map, such as buildings, sidewalks, signs, etc. For example, the local computer device 410 illustrated in FIG. 4 may determine static objects in the environment.

According to some examples, the method includes determining a relative position and a relative angle between a first sensor of the one or more sensors and a forward motion vector of the AV at block 215. For example, the local computer device 410 illustrated in FIG. 4 may determine the relative position and the relative angle. The determined relative position and the determined relative angle may be associated with a highest number of determined static points after ego-motion compensation from a selected set of static points from the static objects determined by the semantic map layer. Leveraging the semantic map layer allows for a more efficient way to find a set of static points used to extrinsically calibrate the one or more sensors. The forward motion vector may be calculated based on a designated central sensor at a main center axis of the AV, using odometry, or another means for determining the direction and coordinates of the forward motion vector.

Furthermore, to extrinsically calibrate based on the portion of the set of static points, the method comprises filtering out points associated with moving objects. For example, the local computer device 410 illustrated in FIG. 4 may filter out points associated with moving objects. The moving objects may be identified when objects detected in the sensor data cannot be correlated to an object represented in the map with the semantic map layer. As such, filtering out the points in the sensor data associated with the moving objects results in a plurality of static points associated with the static objects.

More specifically, the extrinsic calibration may be based on ego-motion compensation. The determining of the relative position and the relative angle may further comprise determining a number of static points for different relative positions and relative angles. For example, the local computer device 410 illustrated in FIG. 4 may determine the number of static points. Each static point is determined to be static based on ego-motion compensation, wherein ego-motion of the one or more sensors is compensated by a velocity estimate of the AV to determine an actual velocity of the static point being less than a maximum threshold from zero.

According to some examples, the method includes setting, at the AV, the first sensor to be at the determined relative position and the determined relative angle from the forward motion vector to extrinsically calibrate the first sensor at block 220. For example, the local computer device 410 illustrated in FIG. 4 may set the first sensor to be at the determined relative position and the determined relative angle.

According to some examples, the method includes, after completion of the calibration, receiving measurements from at least two of the one or more sensors for application towards mechanical control of the AV while the AV is in motion. For example, the local computer device 410 illustrated in FIG. 4 may receive measurements from at least two of the one or more sensors.

According to some examples, the method includes triggering a recalibration based on the AV being in motion and localized to leverage the semantic map data. For example, the local computer device 410 illustrated in FIG. 4 may trigger a recalibration based on the AV being in motion and localized to leverage the semantic map data.

According to some examples, the method includes buffering for updated sensor data in an amount of time less than five minutes for the recalibration. For example, the local computer device 410 illustrated in FIG. 4 may buffer for updated sensor data in an amount of time less than five minutes for the recalibration. The recalibration on the road being less than five minutes, such as only requiring one minute of on-road sensor data is more efficient and an improvement over calibration methods that require the AV to return to a garage for calibration.

Figure 3:
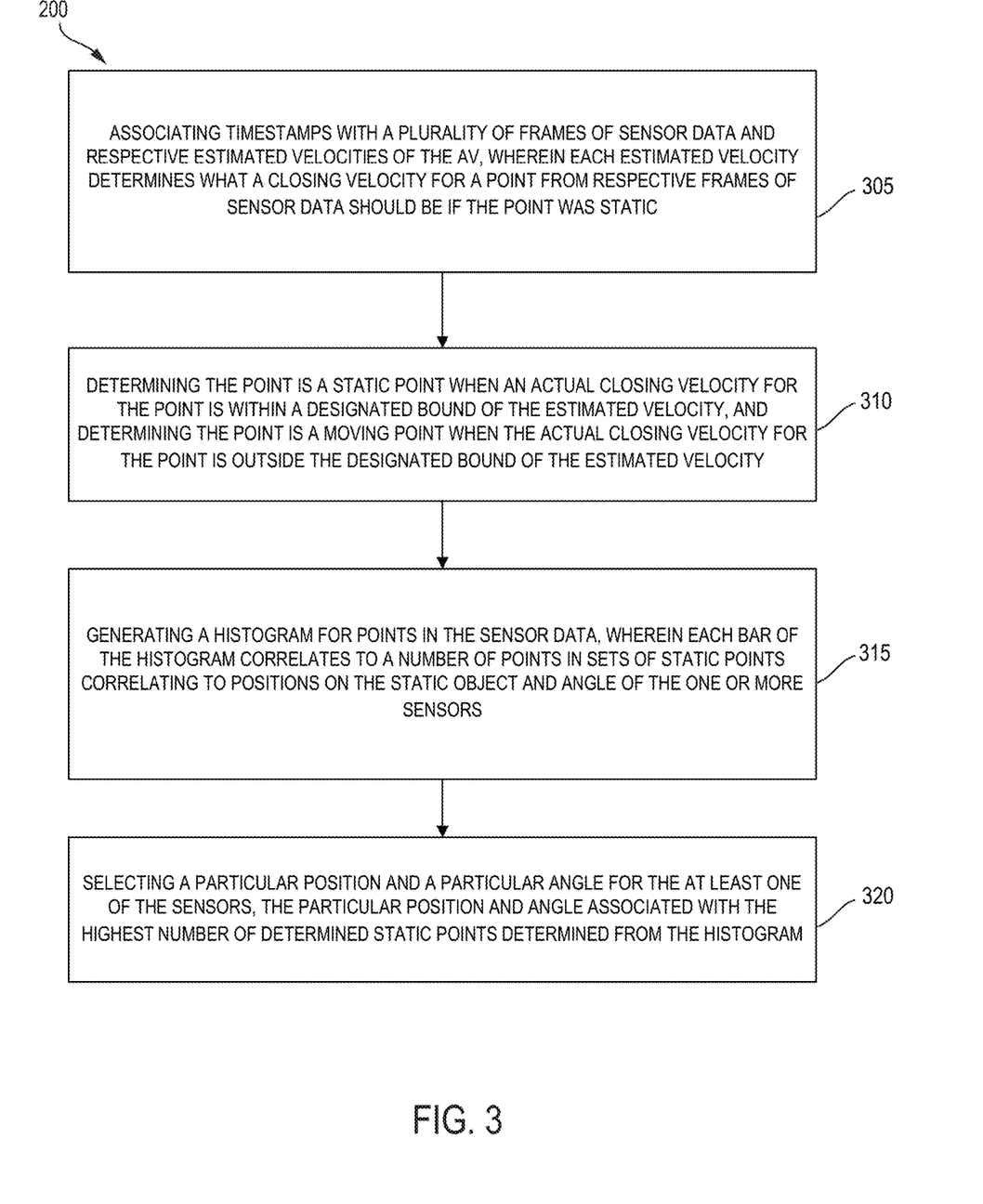
FIG. 3 illustrates another example flow diagram of determining static points for sensor calibration, according to some examples of the present disclosure.

FIG. 3 illustrates an example method 300 for determining static points for sensor calibration. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the determining of the relative position and the relative angle may also further comprise associating timestamps with a plurality of frames of sensor data and respective estimated velocities of the AV at block 305. For example, the sensor systems 404, 406, and 408 respectively, illustrated in FIG. 4 may collect sensor scans and record associated timestamps and the local computer device 410 illustrated in FIG. 4 may determine the relative position and the relative angle. Each estimated velocity may determine what a closing velocity for a point from respective frames of sensor data should be if the point was static.

Therefore, at block 310, the point may be determined to be a static point when an actual closing velocity for the point is within a designated bound of the estimated velocity, and the point may be determined to be a moving point when the actual closing velocity for the point is outside the designated bound of the estimated velocity. For example, if the point has a closing velocity of meters per second towards the sensor and the estimated velocity for the AV based on the associated timestamp is 10.3 meters per second, and a determined discretization error used to determine the designated bound is approximately 0.6 meters per second, then the point is determined to be static.

According to some examples, the method comprises generating a histogram for points in the sensor data at block 315. For example, the local computer device 410 illustrated in FIG. 4 may generate the histogram. Each bar of the histogram correlates to a number of points in sets of static points correlating to positions on a respective static object and angle of the one or more sensors. A number of potential positions and angles are selected for generating the histogram for determining the most accurate position and angle that correlates with where the sensors are located with respect to one another.

According to some examples, the method comprises selecting a particular position and a particular angle for the at least one of the sensors at block 320. For example, the local computer device 410 illustrated in FIG. 4 may select the particular position and angle. The particular position and angle are selected based on being associated with the highest number of determined static points determined from the histogram. In other words, the particular position and the particular angle are selected because all of the points from which the highest number of determined static points are determined are associated with a static object, and therefore the selected particular position and angle with the highest number is the most accurate.

Figure 4:
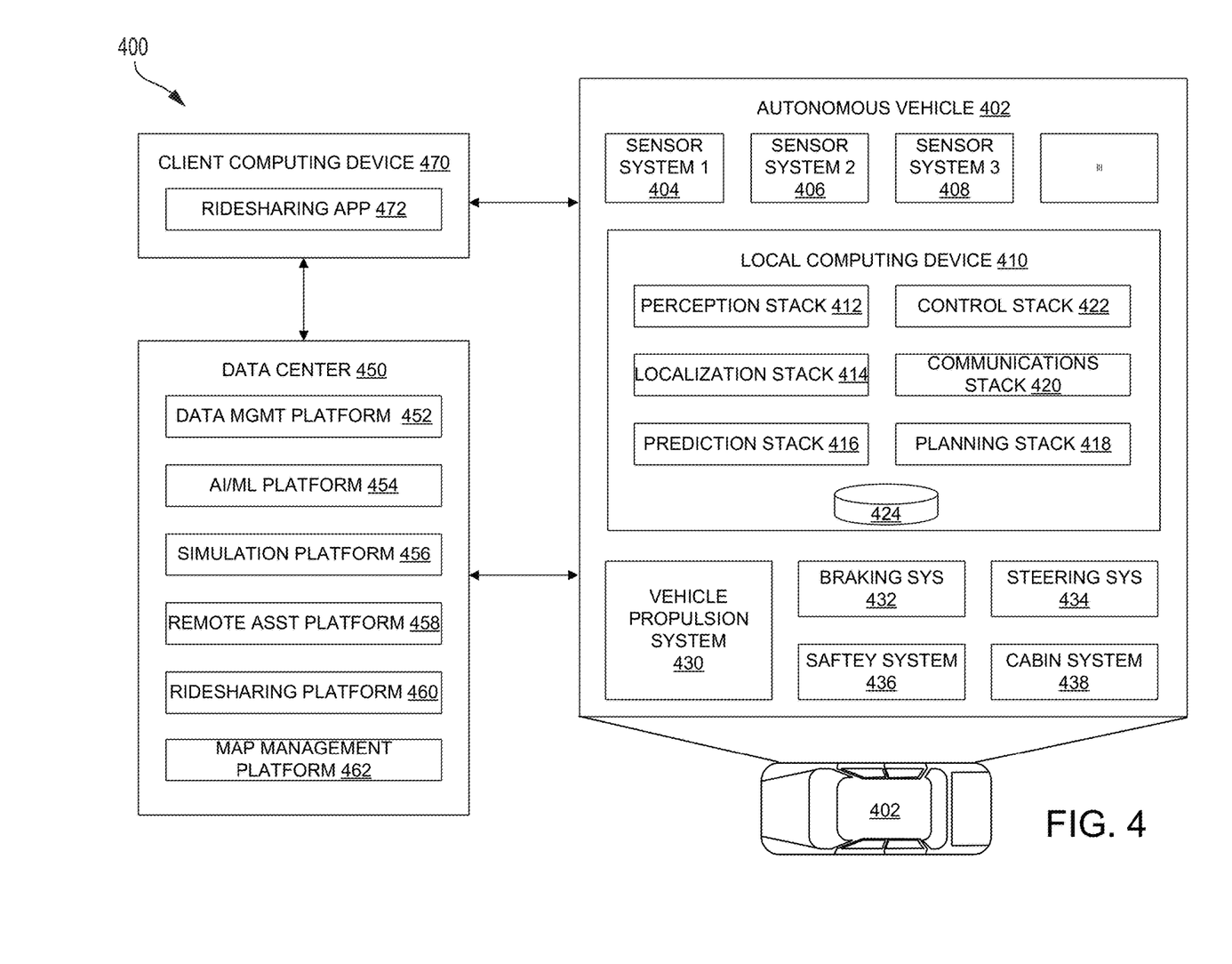
FIG. 4 illustrates an example system environment that can be used to facilitate autonomous vehicle (AV) dispatch and operations, according to some aspects of the disclosed technology.

Turning now to FIG. 4, this figure illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, a wheel braking system (e.g., a disc braking system that utilizes brake pads), hydraulics, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an High Definition (HD) geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image or video data, RADAR data, GPS data, and other sensor data that the data center 450 can use for creating or updating AV geospatial data as discussed further below with respect to FIG. 5 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes one or more of a data management platform 452, an Artificial Intelligence/Machine Learning (AI/ML) platform 454, a simulation platform 456, a remote assistance platform 458, a ridesharing platform 460, and a map management platform 462, among other systems.

Data management platform 452 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
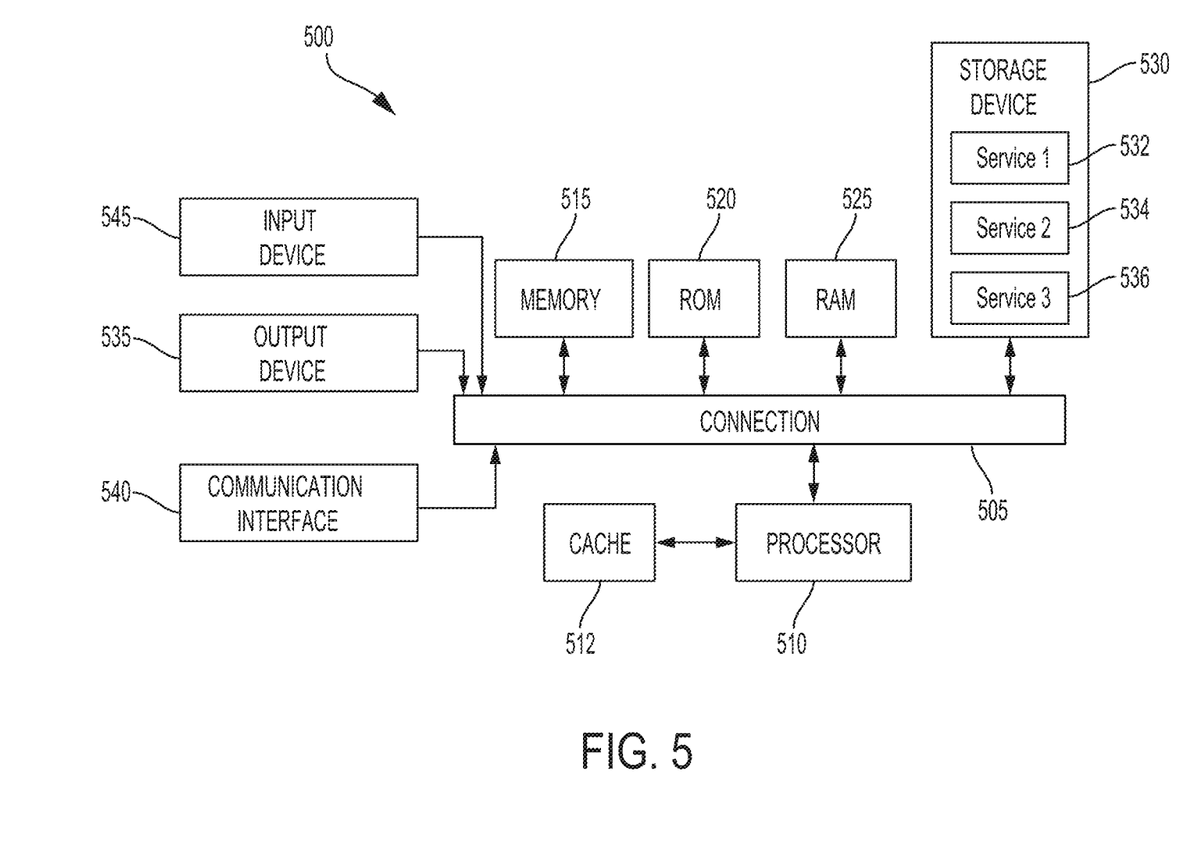
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Aspect 1. A method for calibrating a sensor using targets for calibration the sensor using data from a map, the method comprising: receiving, from one or more sensors of an autonomous vehicle (AV), sensor data made up of points reflected off of objects detected in an environment surrounding the AV while the AV is in motion; determining, at the AV, static objects in the environment by correlating the sensor data with objects represented in a map with a semantic map layer stored on the AV, the semantic map layer including labels providing semantic meaning to objects represented in the map; determining a relative position and a relative angle between a first sensor of the one or more sensors and a forward motion vector of the AV, the determined relative position and the determined relative angle associated with a highest number of determined static points after ego-motion compensation from a selected set of static points from the static objects determined by the semantic map layer; and setting, at the AV, the first sensor to be at the determined relative position and the determined relative angle from the forward motion vector to extrinsically calibrate the first sensor.

Aspect 2. The method of Aspect 1, further comprising: filtering out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects. the filtering out the points in the sensor data associated with the moving objects results in a plurality of static points associated with the static objects.

Aspect 3. The method of any of Aspects 1 to 2, wherein the determining the relative position and the relative angle further comprises: determining a number of static points for different relative positions and relative angles, wherein each static point is determined to be static based on ego-motion compensation, wherein ego-motion of the one or more sensors is compensated by a velocity estimate of the AV to determine an actual velocity of the static point being less than a maximum threshold from zero.

Aspect 4. The method of any of Aspects 1 to 3, wherein the determining the relative position and the relative angle further comprises: associating timestamps with a plurality of frames of sensor data and respective estimated velocities of the AV, wherein each estimated velocity determines what a closing velocity for a point from respective frames of sensor data should be if the point was static; and determining the point is a static point when an actual closing velocity for the point is within a designated bound of the estimated velocity, and determining the point is a moving point when the actual closing velocity for the point is outside the designated bound of the estimated velocity.

Aspect 5. The method of any of Aspects 1 to 4, wherein the forward motion vector is calculated based on a designated central sensor at a main center axis of the AV or using odometry.

Aspect 6. The method of any of Aspects 1 to 5, wherein the set of static points making up one of the static objects is determined by the method comprising: generating histogram for the static points for each candidate relative angle, wherein each bar of the histogram correlates to a number of points in sets of static points correlating to positions on the static object and angle of the one or more sensors; and selecting a particular position and a particular angle for the at least one of the sensors, the particular position and angle associated with the highest number of determined static points determined from the histogram.

Aspect 7. The method of any of Aspects 1 to 6, further comprising: after completion of the calibration, receiving measurements from at least two of the one or more sensors for application towards mechanical control of the AV while the AV is in motion.

Aspect 8. The method of any of Aspects 1 to 7, further comprising: determining the motion of the AV is steady based on a stable velocity, the stable velocity being above a designated threshold, and the AV is moving in a straight path.

Aspect 9. The method of any of Aspects 1 to 8, further comprising: triggering a recalibration while the AV is in motion and leveraging the semantic map layer; and buffering for new sensor data in an amount of time less than five minutes for the recalibration.

Aspect 10: A system includes a storage (implemented in circuitry) configured to store instructions and a processor. The processor configured to execute the instructions and cause the processor to: receive, from one or more sensors of an autonomous vehicle (AV), sensor data made up of points reflected off of objects detected in an environment surrounding the AV while the AV is in motion; determine, at the AV, static objects in the environment by correlating the sensor data with objects represented in a map with a semantic map layer stored on the AV, the semantic map layer including labels providing semantic meaning to objects represented in the map; determine a relative position and a relative angle between a first sensor of the one or more sensors and a forward motion vector of the AV, the determined relative position and the determined relative angle associated with a highest number of determined static points after ego-motion compensation from a selected set of static points from the static objects determined by the semantic map layer; and set, at the AV, the first sensor to be at the determined relative position and the determined relative angle from the forward motion vector to extrinsically calibrate the first sensor.

Aspect 11: The system of Aspect 10, wherein the processor is configured to execute the instructions and cause the processor to: filter out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects.

Aspect 12: The system of any of Aspects 10 to 11, wherein the processor is configured to execute the instructions and cause the processor to: determine a number of static points for different relative positions and relative angles, wherein each static point is determined to be static based on ego-motion compensation, wherein ego-motion of the one or more sensors is compensated by a velocity estimate of the AV to determine an actual velocity of the static point being less than a maximum threshold from zero.

Aspect 13: The system of any of Aspects 10 to 12, wherein the processor is configured to execute the instructions and cause the processor to: associate timestamps with a plurality of frames of sensor data and respective estimated velocities of the AV, wherein each estimated velocity determines what a closing velocity for a point from respective frames of sensor data should be if the point was static; and determine the point is a static point when an actual closing velocity for the point is within a designated bound of the estimated velocity, and determine the point is a moving point when the actual closing velocity for the point is outside the designated bound of the estimated velocity.

Aspect 14: The system of any of Aspects 10 to 13, wherein the forward motion vector is calculated based on a designated central sensor at a main center axis of the AV or using odometry.

Aspect 15: The system of any of Aspects 10 to 14, wherein the processor is configured to execute the instructions and cause the processor to: generate a histogram for the static points for each candidate relative angle, wherein each bar of the histogram correlates to a number of points in sets of static points correlating to positions on the static object and angle of the one or more sensors; and select a particular position and a particular angle for the at least one of the sensors, the particular position and angle associated with the highest number of determined static points determined from the histogram.

Aspect 16: The system of any of Aspects 10 to 15, wherein the processor is configured to execute the instructions and cause the processor to: after completion of the calibration, receive measurements from at least two of the one or more sensors for application towards mechanical control of the AV while the AV is in motion.

Aspect 17: The system of any of Aspects 10 to 16, wherein the processor is configured to execute the instructions and cause the processor to: determine the motion of the AV is steady based on a stable velocity, the stable velocity being above a designated threshold, and the AV is moving in a straight path.

Aspect 18: The system of any of Aspects 10 to 17, wherein the processor is configured to execute the instructions and cause the processor to: trigger a recalibration while the AV is in motion and leveraging the semantic map layer; and buffer for new sensor data in an amount of time less than five minutes for the recalibration.

Aspect 19: A non-transitory computer-readable medium comprising instructions using a computer system. The computer includes a memory (e.g., implemented in circuitry) and a processor (or multiple processors) coupled to the memory. The processor (or processors) is configured to execute the non-transitory computer-readable medium and cause the processor to: receive, from one or more sensors of an autonomous vehicle (AV), sensor data made up of points reflected off of objects detected in an environment surrounding the AV while the AV is in motion; determine, at the AV, static objects in the environment by correlating the sensor data with objects represented in a map with a semantic map layer stored on the AV, the semantic map layer including labels providing semantic meaning to objects represented in the map; determine a relative position and a relative angle between a first sensor of the one or more sensors and a forward motion vector of the AV, the determined relative position and the determined relative angle associated with a highest number of determined static points after ego-motion compensation from a selected set of static points from the static objects determined by the semantic map layer; and set, at the AV, the first sensor to be at the determined relative position and the determined relative angle from the forward motion vector to extrinsically calibrate the first sensor.

Aspect 20: The non-transitory computer-readable medium of Aspect 19, wherein the processor is configured to execute the non-transitory computer-readable medium and cause the processor to: filter out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects.

Aspect 21: The non-transitory computer-readable medium of any of Aspects 19 to 20, wherein the processor is configured to execute the non-transitory computer-readable medium and cause the processor to: determine a number of static points for different relative positions and relative angles, wherein each static point is determined to be static based on ego-motion compensation, wherein ego-motion of the one or more sensors is compensated by a velocity estimate of the AV to determine an actual velocity of the static point being less than a maximum threshold from zero.

Aspect 22: The non-transitory computer-readable medium of any of Aspects 19 to 21, wherein the processor is configured to execute the non-transitory computer-readable medium and cause the processor to: associate timestamps with a plurality of frames of sensor data and respective estimated velocities of the AV, wherein each estimated velocity determines what a closing velocity for a point from respective frames of sensor data should be if the point was static; and determine the point is a static point when an actual closing velocity for the point is within a designated bound of the estimated velocity, and determine the point is a moving point when the actual closing velocity for the point is outside the designated bound of the estimated velocity.

Aspect 23: The non-transitory computer-readable medium of any of Aspects 19 to 22, wherein the forward motion vector is calculated based on a designated central sensor at a main center axis of the AV or using odometry.

Aspect 24: The non-transitory computer-readable medium of any of Aspects 19 to 23, wherein the processor is configured to execute the non-transitory computer-readable medium and cause the processor to: generate a histogram for the static points for each candidate relative angle, wherein each bar of the histogram correlates to a number of points in sets of static points correlating to positions on the static object and angle of the one or more sensors; and select a particular position and a particular angle for the at least one of the sensors, the particular position and angle associated with the highest number of determined static points determined from the histogram.

Aspect 25: The non-transitory computer-readable medium of any of Aspects 19 to 24, wherein the processor is configured to execute the non-transitory computer-readable medium and cause the processor to: after completion of the calibration, receive measurements from at least two of the one or more sensors for application towards mechanical control of the AV while the AV is in motion.

Aspect 26: The non-transitory computer-readable medium of any of Aspects 19 to 25, wherein the processor is configured to execute the non-transitory computer-readable medium and cause the processor to: determine the motion of the AV is steady based on a stable velocity, the stable velocity being above a designated threshold, and the AV is moving in a straight path.

Aspect 27: The non-transitory computer-readable medium of any of Aspects 19 to 26, wherein the processor is configured to execute the non-transitory computer-readable medium and cause the processor to: trigger a recalibration while the AV is in motion and leveraging the semantic map layer; and buffer for new sensor data in an amount of time less than five minutes for the recalibration.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for calibrating a sensor using targets for calibration the sensor using data from a map, the method comprising:
    receiving, from one or more sensors of an autonomous vehicle (AV), sensor data made up of points reflected off of objects detected in an environment surrounding the AV while the AV is in motion;
    determining, at the AV, static objects in the environment by correlating the sensor data with objects represented in a map with a semantic map layer stored on the AV, the semantic map layer including labels providing semantic meaning to objects represented in the map;
    selecting a plurality of different relative positions and relative angles between a first sensor and a forward motion vector of the AV, and determining a number of static points for each relative position and relative angle, the number of static points being from a static object determined by the semantic map layer, wherein each static point is determined to be static based on ego-motion compensation;
    selecting a relative position and a relative angle from the plurality of different relative positions and relative angles, the selected relative position and the selected relative angle associated with a highest number of determined static points after the ego-motion compensation; and
    setting, at the AV, the first sensor to be at the selected relative position and the selected relative angle from the forward motion vector to extrinsically calibrate the first sensor.

2. The method of claim 1, further comprising:
    filtering out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects.

3. The method of claim 1, wherein the determining the relative position and the relative angle further comprises:
    wherein ego-motion of the one or more sensors is compensated by a velocity estimate of the AV to determine an actual closing velocity of the static point, the actual closing velocity being less than a maximum threshold and greater than zero.

4. The method of claim 3, wherein the determining the relative position and the relative angle further comprises:
    associating timestamps with a plurality of frames of sensor data and respective estimated velocities of the AV, wherein each estimated velocity determines what a closing velocity for a point from respective frames of sensor data should be if the point was static; and
    determining the point is a static point when an actual closing velocity for the point is within a designated bound of the estimated velocity, and determining the point is a moving point when the actual closing velocity for the point is outside the designated bound of the estimated velocity.

5. The method of claim 1, wherein the forward motion vector is calculated based on a designated central sensor at a main center axis of the AV or using odometry.

6. The method of claim 1, wherein the set of static points making up one of the static objects is determined by the method comprising:
generating a histogram for the number of static points for each candidate relative angle, wherein each bar of the histogram correlates to a number of points in sets of static points correlating to positions on the static object and angle of the one or more sensors; and
selecting a particular position and a particular angle for the at least one of the sensors, the particular position and angle associated with the highest number of determined static points determined from the histogram.

7. The method of claim 1, further comprising:
after completion of the calibration, receiving measurements from at least two of the one or more sensors for application towards mechanical control of the AV while the AV is in motion.

8. The method of claim 1, further comprising:
determining the motion of the AV is steady based on a stable velocity, the stable velocity being above a designated threshold, and the AV is moving in a straight path.

9. The method of claim 1, further comprising:
triggering a recalibration while the AV is in motion and leveraging the semantic map layer; and
buffering for new sensor data in an amount of time less than five minutes for the recalibration.

10. A system for calibrating a sensor using targets for calibration the sensor using data from a map comprising:
a storage configured to store instructions; and
a processor configured to execute the instructions and cause the processor to:
receive, from one or more sensors of an autonomous vehicle (AV), sensor data made up of points reflected off of objects detected in an environment surrounding the AV while the AV is in motion;
determine, at the AV, static objects in the environment by correlating the sensor data with objects represented in a map with a semantic map layer stored on the AV, the semantic map layer including labels providing semantic meaning to objects represented in the map;
select a plurality of different relative positions and relative angles between a first sensor and a forward motion vector of the AV, and determine a number of static points for each relative position and relative angle, the number of static points being from a static object determined by the semantic map layer, wherein each static point is determined to be static based on ego-motion compensation;
select a relative position and a relative angle from the plurality of different relative positions and relative angles, the selected relative position and the selected relative angle associated with a highest number of determined static points after the ego-motion compensation; and
set, at the AV, the first sensor to be at the selected relative position and the selected relative angle from the forward motion vector to extrinsically calibrate the first sensor.

11. The system of claim 10, wherein the processor is configured to execute the instructions and cause the processor to:
filter out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects.

12. The system of claim 10, wherein ego-motion of the one or more sensors is compensated by a velocity estimate of the AV to determine an actual closing velocity of the static point, the actual closing velocity being less than a maximum threshold and greater than zero.

13. The system of claim 10, wherein the forward motion vector is calculated based on a designated central sensor at a main center axis of the AV or using odometry.

14. The system of claim 10, wherein the processor is configured to execute the instructions and cause the processor to:
generate a histogram for points in the sensor data, wherein each bar of the histogram correlates to a number of points in sets of static points correlating to positions on the static object and angle of the one or more sensors; and
select a particular position and a particular angle for the at least one of the sensors, the particular position and angle associated with the highest number of determined static points determined from the histogram.

15. A non-transitory computer-readable medium comprising instructions, the instructions, when executed by a computing system, cause the computing system to:
receive, from one or more sensors of an autonomous vehicle (AV), sensor data made up of points reflected off of objects detected in an environment surrounding the AV while the AV is in motion;
determine, at the AV, static objects in the environment by correlating the sensor data with objects represented in a map with a semantic map layer stored on the AV, the semantic map layer including labels providing semantic meaning to objects represented in the map;
select a plurality of different relative positions and relative angles between a first sensor and a forward motion vector of the AV, and determine a number of static points for each relative position and relative angle, the number of static points being from a static object determined by the semantic map layer, wherein each static point is determined to be static based on ego-motion compensation;
select a relative position and a relative angle from the plurality of different relative positions and relative angles, the selected relative position and the selected relative angle associated with a highest number of determined static points after the ego-motion compensation; and
set, at the AV, the first sensor to be at the selected relative position and the selected relative angle from the forward motion vector to extrinsically calibrate the first sensor.

16. The non-transitory computer-readable medium of claim 15, wherein the non-transitory computer-readable medium further comprises instructions that, when executed by the computing system, cause the computing system to:
filter out points in the sensor data associated with moving objects, the moving objects are identified when objects detected in the sensor data can not be correlated to an object represented in the map with the semantic map layer, wherein the filtering out the points in the sensor data associated with the moving objects results in a plurality of static points associated with the static objects.

17. The non-transitory computer-readable medium of claim 15, wherein ego-motion of the one or more sensors is compensated by a velocity estimate of the AV to determine an actual closing velocity of the static point, the actual closing velocity being less than a maximum threshold and greater than zero.

18. The non-transitory computer-readable medium of claim 15, the forward motion vector is calculated based on a designated central sensor at a main center axis of the AV or using odometry.

19. The non-transitory computer-readable medium of claim 15, wherein the non-transitory computer-readable medium further comprises instructions that, when executed by the computing system, cause the computing system to:

generate a histogram for points in the sensor data, wherein each bar of the histogram correlates to a number of points in sets of static points correlating to positions on the static object and angle of the one or more sensors; and select a particular position and a particular angle for the at least one of the sensors, the particular position and angle associated with the highest number of determined static points determined from the histogram.

20. The non-transitory computer-readable medium of claim 15, wherein the non-transitory computer-readable medium further comprises instructions that, when executed by the computing system, cause the computing system to:

determine the motion of the AV is steady based on a stable velocity, the stable velocity being above a designated threshold, and the AV is moving in a straight path.

* * * * *